Figure 1:
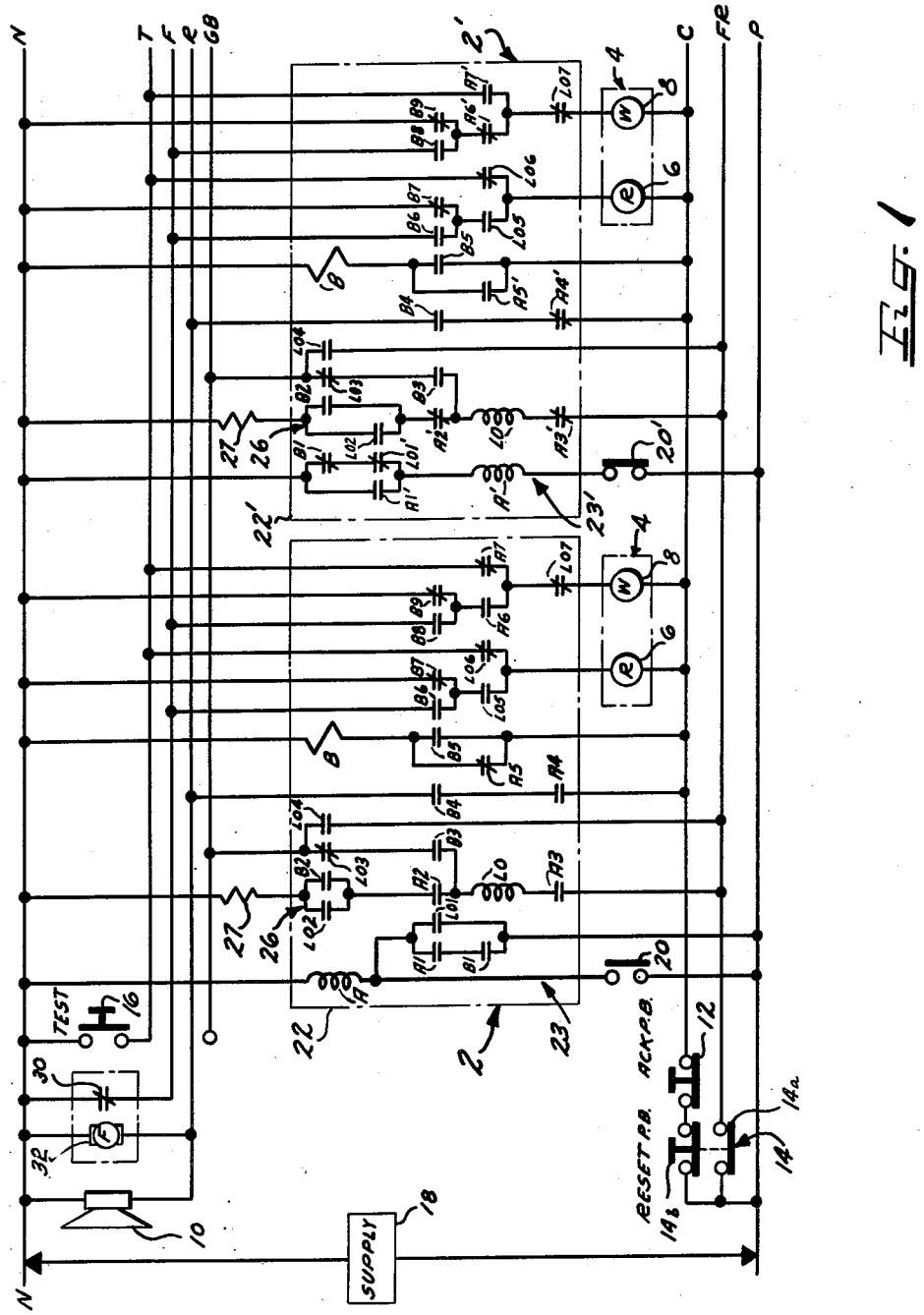

| CONDITION | NAME-PLATE LIGHT | | AUDIBLE SIGNAL | "A" RELAY | | "A¹" RELAY | "B" RELAY | "LO" RELAY |
|---|---|---|---|---|---|---|---|---|
| | RED LAMP | WHITE LAMP | | SIGNAL CON. N.O. | SIGNAL CON. N.C. | | | |
| NORMAL | OFF | OFF | OFF | DEENERGIZED | ENERGIZED | ENERGIZED | ENERGIZED | DEENERGIZED |
| ALERT | FLASHING | FLASHING | ON | ENERGIZED | DEENERGIZED | DEENERGIZED | ENERGIZED | ENERGIZED |
| OFF-NORMAL | STEADY-ON | STEADY-ON | OFF | ENERGIZED | DEENERGIZED | DEENERGIZED | DEENERGIZED | ENERGIZED |
| RETURN TO NORM. | STEADY-ON | OFF | OFF | DEENERGIZED | ENERGIZED | ENERGIZED | DEENERGIZED | ENERGIZED |
| RESET | OFF | OFF | OFF | DEENERGIZED | ENERGIZED | ENERGIZED | ENERGIZED | DEENERGIZED |
| LAMP TEST | ON | ON | OFF | DEENERGIZED | ENERGIZED | ENERGIZED | ENERGIZED | DEENERGIZED |

OPERATIONAL SEQUENCE

Fig. 2

INVENTOR.
Robert J. Marmorstone
BY
Russell E. Hattis 2,701,872
Patented Feb. 8, 1955

2,701,872

ANNUNCIATOR SYSTEM

Robert J. Marmorstone, Chicago, Ill., assignor to Panellit, Inc., Skokie, Ill., a corporation of Illinois Application May 17, 1954, Serial No. 430,301

14 Claims. (Cl. 340—223)

The present invention relates to annunciator or alarm systems and more particularly to a visual annunciator system for indicating the presence of one or more abnormal conditions in a group of closely related variables, although many aspects of the invention have a much broader application.

Wherever processes have closely interrelated variables, or where automatic machinery is equipped with safety shut-down devices, it is important to pin point quickly the source of trouble. On some process applications, the cause of trouble is difficult to locate. When one variable goes off-normal, many others follow, producing a group of alarms that require careful interpretation. On complicated production machinery, any one of many factors may cause automatic shut-down, and costly production time is wasted in seeking out the cause of trouble.

One of the objects of this invention is to provide an annunciator system wherein all abnormal interrelated variables may be quickly identified by visual or other means and, further, wherein the first variable to become abnormal is indicated so that the cause and effects of trouble in a system is immediately apparent to the operator.

Another object of the invention is to provide an annunciator system wherein the first variable of a group of interrelated variables to become abnormal is indicated by a distinguishing indication, and wherein the distinguishing indication of the first abnormal variable may be removed and changed to another alarm indication so that the annunciator system is made ready for the identification of the first alarm of a subsequent series.

A further object of the invention is to provide an annunciator system for use with a number of closely interrelated variables wherein the first variable to become abnormal is indicated by a distinguishing visual or other indication, and wherein the distinguishing indication remains even after the particular variable returns to a normal condition unless a reset switch is actuated, whereby a record of the abnormal condition remains until the operator has logged such information.

Still another object of the invention is to provide an annunciator system of the above character which utilizes relay control circuits of utmost simplicity and reliability.

The present invention gives an immediate indication of the cause of shut-down or otherwise off-normal condition by clearly identifying the first-to-become abnormal variable to occur in a group of interrelated variables and also by identifying the other abnormal variables which became abnormal following the first abnormal variable. Further, it provides a flexible means of grouping and resetting the various annunciator units associated with the various variables and presents the information in a manner such that a minimum amount of interpretation is required to determine the causes and effects of trouble in the system.

In the preferred form of the invention a visual color indication indicates abnormal conditions. When an off-normal condition occurs, the first signal will cause a flashing red indication and subsequent signals indicating related abnormal values will flash white. This is the alert stage and is accompanied by an audible signal. When the operator pushes an acknowledgement push button, the audible alarm is silenced, and both the red and white signals change from flashing to a steady-on condition.

All signals lock-in on momentary contact until the signals are acknowledged. Then the white signals, indicating abnormal conditions occurring subsequent to the first to occur abnormal condition, will drop out as these white signal indicated conditions return to normal. The red signal, however, will not drop out until a reset push button is actuated so that a continuous record of the initial cause of the trouble is presented until this information can be logged.

It is not uncommon for off-normal conditions to continue for extended periods of time. Normally, the existence of a red signal associated with one of a large number of interrelated variables will prevent a subsequent red signal from occurring in the annunciator units associated with variables of this group. Once the information on a first to occur abnormal condition has been logged, the annunciator system may be cleared of the red signal by changing the red to a white signal, if the associated variable is still abnormal, so that the annunciator system is not monopolized by the first group of interrelated variables which becomes abnormal. Thus, identification of the first alarm in a subsequent series of alarms may be obtained.

The circuitry utilized with the present invention is such that the annunciators associated with a number of variables may be grouped together in any desired number of related groups quickly and easily.

Other objects, advantages and features of the invention will become apparent on making reference to the specification to follow and the drawings illustrating an exemplary embodiment of the invention wherein:

Fig. 1 is a circuit diagram of an annunciator system incorporating features of the invention; and Fig. 2 is a chart illustrating the operation of the circuit of Fig. 1.

It should be understood that although the particular relay circuitry to be described forms a specific aspect of the invention and the simplicity of the interrelationship of the various relay circuits shown in the drawings are highly advantageous, the broader aspects of applicant's invention are not limited to a few specific circuits for carrying out applicant's broad inventive concept since the latter is unique and novel in and of itself and has materially enhanced the annunciator field.

The term "variable" used in the specification to follow means any variable quantity, whether the variation is intended or not, such as the temperatures or pressures of a chemical process, the temperature conditions throughout different parts of a motor or generator, the voltage or current in different parts of an electrical system, etc. Also, the term "annunciator unit" refers to a related group of elements which are associated with a variable in such a manner as to indicate when the variable is either in a normal or abnormal condition.

The embodiment of the invention illustrated in the drawings shows two annunciator units 2 and 2' which are associated with interrelated variables. By "interrelated variables" is meant a group of variables wherein a variation of one of the variables may, under certain conditions, affect the condition of the other variable or variables. For example, in a chemical process, the pressure at one point in the process may affect the temperature or pressure at another point in the system; in the case of a power plant, a short circuit or overload in any particular circuit may result in an excessive temperature in the rotor or stator of the generator which produces the current.

Although only two annunciator units are shown in the drawings, it is obvious and apparent that a much larger number of annunciator units would be associated together to form a related group of annunciator units which are tied together by various common busses and control switches, to be described. In the preferred form of the invention, visual means in the form of colored lighting units 4 indicate, respectively, the condition of the variable associated with the corresponding annunciator unit. Each of the colored lighting units 4 includes a red light bulb 6 and a white light bulb 8. These lights may be mounted behind transparent or translucent name plates, or may be separately visible lights which are grouped together on the face of a control cabinet with appropriate identification to indicate the process variables with which the lighting units are associated.

Before proceeding with a description of the circuitry for controlling these lights, a description of the manner in which the lighting units are utilized and the various manually operable control switches will be discussed, so that the broader aspects of the invention will be clearly in mind before the details of the circuitry are discussed.

Assume, for a moment, that a control panel contains eight annunciator units which are associated with eight corresponding interrelated variables, and that annunciator units 2 and 2' represent two of the eight annunciator units. Assume, further, that a fault originates with the variable associated with annunciator unit 2 and that because of this fault the variable associated with the annunciator unit 2' also becomes abnormal while the remaining six annunciator units and variables associated therewith are undisturbed. With the occurrence of these abnormal conditions, an operator would be attracted to the light panel housing the lighting unit 4 by the sounding of an audible alarm or bell 10. Means is provided for flashing the red light 6 of the indicating unit 2 associated with the process variable which first becomes abnormal. The flashing indication of the light attracts the operator to the portion of the control panel housing the lighting units 4. Means is also provided for flashing the white light 8 of the annunciator unit 2' associated with the other abnormal process variable which became abnormal following the variable associated with the annunciator unit 2. Conversely, if the variables associated with annunciator unit 2' was the source of the trouble, then the red light 6 of that unit would be flashing and the variables affected thereby would be flashing a white light.

The annunciator system of the present invention thus immediately apprises an operator as to which variable of a group of interrelated variables is the probable source of trouble, and also indicates all of the variables which became abnormal following the first abnormal variable. After making a note of the location of the present trouble, the operator depresses an acknowledge push button 12 which changes the flashing red and white indications of the lighting units to a steady red and white light indication, respectively. The operator can then dispatch suitable personnel to investigate the trouble points in a system indicated by the annunciator units. As soon as the difficulty is corrected, the lighting unit 4 associated with the variable whose difficulty followed from the first abnormal variable will become unlighted to indicate that the fault or abnormal condition has been cleared in at least part of the system. The red light indication of the light 6, however, will not drop out until a reset push button 14 is depressed and the variable associated with the annunciator unit 2 has become normal again. If the variable associated with the annunciator unit 2 is still abnormal following the depression of the reset button 14, the indication of the lighting unit 4 of unit 2 will change from red to a steady-on white light upon the energization of light 8. The purpose of this arrangement is to clear the red signal from the group of eight associated annunciator units so that a red signal may again appear to indicate the first signal of a subsequent series of alarms.

A normally open test push button 16 is actuated to test the continuity of the various annunciator lights.

The lighting units 4 and the audible alarm 10 are controlled by a series of relay circuits illustrated in Fig. 1. The energization of the relay circuits are in turn controlled by a suitable source of A. C. or D. C. voltage 18, various push button contacts 12, 14 and 16, and by means including remote actuator alarm contacts 20 and 20' asociated with annunciator units 2 and 2'. The remote alarm contacts 20 and 20' are controlled directly by suitable condition responsive means at the location of the variable to be indicated, and actuation of these contacts indicates the presence of an abnormal condition. The condition responsive means for controlling these contacts may, for example, be thermostats where temperature variables are involved, or may be relays where current or voltage conditions are to be indicated, etc. The remote alarm contact 20 is shown as a normally open contact whereby the remote alarm contact 20' is shown as a normally closed contact. Obviously, a relay system may be devised which operates on either a normally closed or a normally open contact. Power plants, for example, prefer to utilize normally open alarm contacts to minimize drain on the battery system used for energizing the annunciator circuits, and many chemical and other industries prefer to utilize normally closed alarm contacts.

The description to follow will describe the operation of the annunciator unit 2 associated with the normally open alarm contacts 20, but it should be understood that the annunciator unit 2' utilizing a normally closed remote alarm contact operates in substantially the identical manner and utilizes substantially the identical circuitry except for minor variations in the contact arrangement associated with a relay controlled by these remote contacts. The relay coils and contacts of the annunciator units 2 and 2' which have corresponding functions have been given similar reference characters. Primes (') are used to show any elements which are structurally somewhat different.

Reference to the sets of contacts of the various relays will be made by identifying the contacts by the letters of the corresponding relay followed by the number of the contact set of that relay. Thus, for example, a reference to contacts A4 will indicate that the contacts A4 are a fourth set of contacts actuated by relay A. Further, a contact which is normally open (that is, opened when the relay is deenergized) is identified by a pair of spaced parallel lines and a contact which is normally closed (that is, when the relay is unenergized) is identified by a pair of spaced lines with an inclined line bridging the said two spaced lines.

All of the relay coils and contacts associated with annunciator unit 2 are mounted together on a common chassis to form a unitary plug-in unit identified by the reference numeral 22. Each plug-in unit has three relays associated therewith, namely an alarm relay A, which is initially energized upon the closing of the remote alarm relay contacts 20, a lockout relay LO which is energized only if the relay A is the first relay of the associated group of annunciator units to become energized, and an acknowledgment relay B which is a normally energized relay which controls the flashing and steady-on conditions of the lights 6 and 8. The contacts of each of these relays are part of the energization circuit of other relays and of the lights 6 and 8 so that the energization of one of the relays has its effect on the other circuits of the annunciator unit in a manner to be described.

The circuit 23 associated with the energization of relay A, hereinafter to be referred to as the alarm relay circuit, is coupled across common busses P and N, respectively, which busses are connected to the opposite terminals of a suitable power supply 18. The P bus will sometimes be referred to as the positive bus and the N bus as the neutral or negative bus. The alarm relay circuit 23 includes the remote alarm contacts 20 in series with the alarm relay A, and the remote contacts 20 close to energize the circuit 23 when the associated variable becomes abnormal. A holding circuit is established for relay A through normally open contacts A1 and B1. The B relay is normally energized so that the B1 contacts are closed when relay A is initially energized so that even momentary abnormal conditions are registered by the annunciator unit. If relay A is the first to be energized in a group of related annunciator units, then lockout relay LO becomes energized through a lockout relay circuit 26 including positive bus P, the contact pair 14a of normally closed reset switch 14, a common reset bus FR, normally open contacts A3 which are closed since relay A is energized, relay coil LO, normally open contacts A2, normally open contacts B2 (relay B is then energized) and current limiting resistor 27 connected to the neutral bus N. The normally open contacts LO2 in parallel with normally open contacts B2 provide a means for holding the energization of relay LO following the depression of the acknowledge push button 12 which deenergizes relay B and opens contacts B–2.

Upon the initial energization of relays A and LO in a manner just described, red light 6 will be energized through a red light circuit including positive bus P, the other normally closed contacts 14b of the reset switch 14, normally closed acknowledge switch 12, a common bus C, red light 6, normally open switch contacts LO5 which are now closed because relay LO is energized, normally open switch contacts B6 which are closed because relay B is energized, flashing switch bus F, and flashing switch contacts 30 which are connected to the common neutral bus N. Flashing switch 30 is oscillated between its open and closed conditions by a flashing motor 32 which is coupled across the terminals of the alarm bell 10. The alarm bell and flashing motor control circuit includes the alarm bell 10 and flasher motor 32 in parallel, the normally open contacts B4 and A4, the common bus C, the normally closed acknowledge and reset switches 12 and 14, and the positive bus P. Thus, on the energization of relay A, contacts A4 and B4 are closed which thereby energizes the audible alarm 10 and the flasher motor 32. Simultaneously, the red light 6 is flashed on and off as the flasher motor 32 alternates the flashing switch 30.

Besides the branch of the red light 6 just described, the low voltage side (a D. C. voltage source is assumed, but, of course, A. C. could be used) of the contacts LO5 is connected to the neutral bus N through normally closed switch contacts B7 (which are initially open) thereby establishing a transfer branch which becomes energized when the acknowledge switch 12 is momentarily opened to change the red light from a flashing to a steady-on condition.

If relay A of the annunciator 2 was not the first relay A of the grouped annunciator units to become energized, the lock-out relay LO does not become energized, whereupon normally open contacts LO5 in the red light circuit are open so that the light 6 remains unenergized. The lock-out relay in the annunciator unit which was first energized renders the lock-out relays of the other annunciator units of the group inoperative by shorting the terminals of the latter lock-out relays in a manner now to be described. Therefore, only the red light in the first actuated annunciator unit can be lighted.

The by-passing of the lockout relays is effected by coupling the reset bus FR to the low voltage point of the lockout relays of the annunciator units which are to be rendered inoperative through a circuit including normally open contacts LO4 extending between the reset bus FR and a common grouping bus GB. The grouping bus GB connects with the low voltage side of the LO relays of the annunciator units whose LO relays are unenergized through normally closed lockout contacts LO3 and normally open contacts B3, which are initially closed because relay B is initially energized. These latter lockout relays are thus by-passed or short circuited.

Where the red light of annunciator unit 2 is on due to the energization of the associated lockout relay LO, the low voltage side of the latter relay is disconnected from the grouping bus GB by normally closed contacts LO3.

If the lockout relay LO of any annunciator unit is unenergized, and the alarm relay A is energized, the white light 8 becomes energized through a circuit including positive bus P, normally closed reset and acknowledge switches 14 and 12, common bus C, white light 8, normally closed contacts LO7, normally open contacts A6, and normally open contacts B8 which are initially closed, and the flashing bus F. The white light 8 thus flashes on and off when the relay A is energized and lockout relay LO is deenergized. When the acknowledge button 12 is depressed, the white light 8 is energized through an alternate branch including the normally closed switch contacts B9 leading to the neutral bus N, and the white light is then in a steady-on condition.

The energization circuit of the acknowledge relay B includes positive bus P, normally closed reset and acknowledge switches 14b and 12, common bus C, normally closed contacts A5 or alternately through holding contact B5, and relay coil B leading to the neutral bus N. Thus, relay B is energized through the normally closed contacts A5 or its own holding contacts B5 until either the normally closed acknowledge switch 12 or the normally closed reset switch 14 is open. When the acknowledge switch 12 is momentarily opened, relay B becomes deenergized since its holding contacts B5 open and normally closed contacts A5 are then open. The energization of the light 6 or 8, whichever is lit at that time, is then transferred from the flashing bus F to the neutral bus N through transfer contacts B7 or B9, which close upon the deenergization of relay B.

It can be seen that when the white light 8 is lit in a steady-on condition and the remote alarm contacts 20 open due to the return of the associated variable to a normal value, that the relay A becomes deenergized since its holding circuit is open (contacts B1 were previously opened when acknowledge switch 12 was depressed).

The light 8 will then become deenergized as the normally open switch contacts A6 open.

Whenever the A relay of an annunciator unit is the first to become energized, as stated before, the opening of the remote switch contact 20 does not deenergize the A relay because of the holding circuit established by the normally open relay contact LO1. Relay A in turn maintains the energization of the lockout relay LO by means of the normally open contacts A3 so that the only way to extinguish the red light 6 once it has become energized is to open the reset switch contacts 14a which then deenergizes the lockout relay. If, when the reset switch 14 is momentarily opened, the remote alarm contact 20 is closed indicating the continued existence of an abnormal condition, the red light becomes extinguished and the white light 8 becomes energized since the normally closed contacts LO7 in series with the white light then is closed and the switch contacts A6 in the white light circuit remains closed because relay A is held energized through the closed holding contacts LO1. The reset switch 14 thus removes the red indication from the annunciator unit 2 and clears the system for a subsequent series of alarms.

For light testing purposes, energization circuits are established to the various lights through the normally closed switch contacts LO6 and A7 upon the depression of the normally open test switch contacts 16. A common test bus T connects the test switch 16 to all of the LO6, A7 and A7' contacts of the annunciator units.

As previously stated, the relay circuitry of the plug-in relay circuit 22' of the annunciator unit 2' is substantially identical to the relay circuit for annunciator unit 2 except that the plug-in unit 22' is utilized with normally closed remote alarm contacts 20' which open rather than close upon the occurrence of an abnormal condition. Accordingly, the alarm relay A', corresponding to the alarm relay A in the annunciator unit 2, is in a circuit which maintains the relay A' in an energized state when the associated variable is in a normal condition. The energization circuit of relay A' can be traced from positive bus P through the remote normally closed alarm relay contacts 20', through relay coil A' and through normally open holding contacts A1' leading to the neutral bus N. The relay A' is initially energized by the depression of the acknowledge switch 12 which energizes the acknowledge relay B, in the manner previously described in connection with the annunciator unit 2. When the relay B is deenergized and the associated variable is normal, the relay A' is energized through a circuit including positive bus P, normally closed alarm contacts 20', relay coil A', and normally closed contacts LO1' and normally closed contacts B1 leading to the neutral bus N. The contacts LO1', when opened upon the energization of lockout relay LO1, performs a similar function to contacts LO1 in annunciator unit 2. It thus locks-out or maintains relay A' deenergized to lock-in a red light indication, if the associated variable is the first-to-become abnormal variable.

Thus, the preferred form of the invention provides an annunciator system wherein the indication of the first variable of a group of interrelated variables to become abnormal is continuously indicated until a reset button is depressed. Then the red changes to a white light indication if the associated variable is still off-normal. With regard to variables which become abnormal following another variable, prior to the depression of the reset button 14 and subsequent to the depression of the acknowledge push button 12, the return of a variable to abnormal will extinguish the associated white light. Prior to the depression of the acknowledge push button 12, however, all light indications are held even if the abnormal conditions exist only momentarily. Grouping of annunciator units is simply effected by tying in new plug-in annunciator units to the various common busses.

It should be understood that numerous modifications may be made of the preferred form of the invention above described without deviating from the broader aspects of the invention.

I claim:
1. An annunciator system for indicating the presence of abnormal variables in a group of interrelated variables comprising means for providing two different alarm indications for each variable of said group, one indication indicating that the associated variable is the first of a series of said related variables to become abnormal and the other indication indicating that the associated variable has become abnormal subsequent to another variable of the series, and control means for said first-mentioned means, said control means being responsive to the condition of the variable of said group for causing said first-mentioned means to produce said one indication for the first-to-become abnormal variable and to produce said other indication for the variables which become abnormal subsequent to said first-to-become abnormal variable.

2. An annunciator system for indicating the presence of abnormal variables in a group of interrelated variables comprising means for providing two different alarm indications for each variable of said group, one indication indicating that the associated variable is the first of a series of said related variables to become abnormal and the other indication indicating that the associated variable has become abnormal subsequent to another variable of the series, control means for said first-mentioned means, said control means being responsive to the condition of the variables of said group for causing said first-mentioned means to produce said one indication for the first-to-become abnormal variable and to produce said other indication for the variables which become abnormal subsequent to said first-to-become abnormal variable, and means for changing the alarm indication associated with the first-to-become abnormal variable to another alarm indication if the latter variable has not returned to normal so as to clear the indicating means for a subsequent series of alarms.

3. An annunciator system for indicating the presence of abnormal variables in a group of interrelated variables comprising means for providing two different alarm indications for each variable of said group, one indication indicating that the associated variable is the first of a series of said related variables to become abnormal and the other indication indicating that the associated variable has become abnormal subsequent to another variable of the series, control means for said first-mentioned means, said control means being responsive to the condition of the variable of said group for causing said first-mentioned means to produce said one indication for the first-to-become abnormal variable and to produce said other indication for the variables which become abnormal subsequent to said first-to-become abnormal variable, and holding means for maintaining the alarm indication only for the variable which first becomes abnormal even though the associated variable returns to normal.

4. An annunciator system comprising a group of condition-indicating means to be associated with an interrelated group of variables, each of said condition-indicating means being capable of producing two different colored alarm indications, one of said colored alarm indications indicating that the associated variable is the first of a series of said interrelated group of variables to become abnormal and the other colored alarm indication indicating that the associated variable is abnormal following another abnormal variable of the series, first alarm actuating means associated with each condition-indicating means and responsive to the abnormal condition of the associated variable for effecting said one alarm indication and for rendering the first alarm actuating means associated with the other condition-indicating means of the group inoperative, second alarm actuating means associated with each condition-indicating means and responsive to the abnormal condition of the associated variable for effecting said other alarm indication, and means associated with each condition-indicating means for preventing the operation of said second alarm actuating means if the first alarm actuating means is operative.

5. An annunciator system comprising a group of condition-indicating means to be associated with an interrelated group of variables, each of said condition-indicating means being capable of producing two different alarm indications, one of said alarm indications indicating that the associated variable is the first of a series of said interrelated group of variables to become abnormal and the other alarm indication indicating that the associated variable is abnormal following another abnormal variable of the series, first alarm actuating means associated with each condition-indicating means and responsive to the abnormal condition of the associated variable for effecting said one alarm indication and for rendering the first alarm actuating means associated with the other condition-indicating means of the group inoperative, second alarm actuating means associated with each condition-indicating means and responsive to the abnormal condition of the associated variable for effecting said other alarm indication, and means associated with each condition-indicating means for preventing the operation of said second alarm actuating means if the first alarm actuating means is operative.

6. An annunciator system comprising a group of condition-indicating means to be associated with an interrelated group of variables, each of said condition-indicating means being capable of producing two different alarm indications, one of said alarm indications indicating that the associated variable is the first of a series of said interrelated group of variables to become abnormal and the other alarm indication indicating that the associated variable is abnormal following another abnormal variable of the series, first alarm actuating means associated with each condition-indicating means and responsive to the abnormal condition of the associated variable for effecting said one alarm indication and for rendering the first alarm actuating means associated with the other condition-indicating means of the group inoperative, second alarm actuating means associated with each condition-indicating means and responsive to the abnormal condition of the associated variable for effecting said other alarm indication, means associated with each condition-indicating means for preventing the operation of said second alarm actuating means if the first alarm actuating means is operative, and manually operable means for transferring operation from said first alarm to said second alarm actuating means whereby the condition-indicating means are cleared to indicate the first abnormal variable of a subsequent series of abnormal variables within said group.

7. An annunciator system comprising a group of condition-indicating means to be associated with an interrelated group of variables, means for providing a first-to-become abnormal alarm indication on the condition-indicating means which is associated with the variable of said group which first becomes abnormal, means for providing a second alarm indication on the other condition-indicating means which are associated with variables which become abnormal following another variable, manually operable acknowledgment means for changing said first and second alarm indications to another and respectively different alarm indication which indicates that the alarms have been acknowledged, means operative after the actuation of said acknowledgment means for holding only the alarm indication indicating the first variable to become abnormal even though the associated variable returns to normal, and resetting means for removing the alarm indications of the condition-indicating means associated with the first-to-become abnormal variable if that variable has returned to normal and for changing the alarm indication of said latter condition-indicating means if the associated variable has not returned to normal so that the annunciator system is cleared to receive alarms on the first of a subsequent series of variables to become abnormal.

8. An annunciator system comprising a group of condition-indicating means to be associated with an interrelated group of variables, means for providing a first-to-become abnormal alarm indication on the condition-indicating means which is associated with the variable of said group which first becomes abnormal, means for providing a second alarm indication on the other condition-indicating means which are associated with variables which become abnormal following another variable, and means for removing the alarm indications of the condition-indicating means associated with the first-to-become abnormal variable if that variable has returned to normal and for changing the alarm indication of said latter condition-indicating means if the associated variable has not returned to normal so that the annunciator system is cleared to receive alarms on the first of a subsequent series of variables to become abnormal.

9. An annunciator system comprising a group of condition-indicating means to be associated with an interrelated group of variables, means for providing a first-to-become abnormal alarm indication on the condition-indicating means which is associated with the variable of said group which first becomes abnormal, means for providing a second alarm indication on the other condition-indicating means which are associated with variables which become abnormal following another variable, and means for changing the alarm indication of the indicating means associated with first-to-become abnormal variable to another alarm indication so that the annunciator system is cleared to receive alarms on the first of a subsequent series of variables to become abnormal.

10. An annunciator system comprising a group of condition-indicating means to be associated with an interrelated group of variables, means for providing a first-to-become abnormal alarm indication on the condition-indicating means which is associated with the variable of said group which first becomes abnormal, means for providing a second alarm indication on the other condition-indicating means which are associated with variables which become abnormal following another variable, manually operable acknowledgement means for changing said first and second alarm indications to another and respectively different alarm indication which indicates that the alarms have been acknowledged, and means operative after the actuation of said acknowledgment means for holding only the alarm indication indicating the first variable to become abnormal even though the associated variable returns to normal.

11. An annunciator system comprising a group of condition-indicating means to be associated with an interrelated group of variables, means for providing a first-to-become abnormal alarm indication on the condition-indicating means which is associated with the variable of said group which first becomes abnormal, means for providing a second alarm indication on the other condition-indicating means which are associated with variables which become abnormal following another variable, manually operable acknowledgment means for changing said first and second alarm indications to another and respectively different alarm indication which indicates that the alarms have been acknowledged, means operative before the actuation of said acknowledgement means for holding the alarm indications of all abnormal variables, and means operative after the actuation of said acknowledgment means for holding only the alarm indication indicating the first variable to become abnormal even though the associated variable returns to normal.

12. An annunciator system for indicating the presence of abnormal variables in a group of interrelated variables comprising means for providing two different alarm indications for each variable of said group, one indication indicating that the associated variable is the first of a series of said related variables to become abnormal and the other indication indicating that the associated variable has become abnormal subsequent to another variable of the series, control means for said first-mentioned means, said control means being responsive to the condition of the variables of said group for causing said first-mentioned means to produce said one indication for the first-to-become abnormal variable and to produce said other indication for the variables which become abnormal subsequent to said first-to-become abnormal variable, and means for changing the alarm indication associated with the first-to-become abnormal variable to said other alarm indication if the latter variable has not returned to normal so as to clear the indicating means for a subsequent series of alarms.

13. An annunciator system for indicating the presence of abnormal variables in a group of interrelated variables comprising first means for each variable for providing a first alarm indication indicating that the associated variable was the first of the group to become abnormal, second means for each variable for providing a second alarm indication indicating that the associated variable became abnormal following the first-to-become abnormal variable, respective circuits for controlling the energization of said first and second alarm indicating means, an alarm relay for each variable having contacts in the energization circuits of the associated alarm indicating means and adapted to prepare said circuits for energization when said alarm relay is in a first abnormal-indicating position and to disable said circuits when the relay is in a second normal-indicating position, means for operating said alarm relays respectively into said first and second positions when the associated variables are respectively abnormal and normal, a lock-out relay and an energization circuit therefor for each variable and having contacts in the energization circuits of the associated alarm indicating means, which contacts are adapted to energize the energization circuit of a prepared one of said associated alarm indicating means and to disable the energization circuit of the other associated alarm indicating means when said lock-out relay is in one position, and to energize the energization circuit of the said other prepared one of the associated alarm indicating means and to disable the energization circuit of said one alarm indicating means when said lock-out relay is in another position, each alarm relay having contacts on the energization circuit of the associated lock-out relay for energizing the same when the alarm relay is in said first position and for disabling the same when the alarm relay is in the second position, and a lock-out relay disabling line common to all of the lock-out relays, which line is connected to a terminal of each lock-out relay through contacts of the same, said last-mentioned contacts being opened when the associated lock-out relay is in said other position and are closed when said lock-out relay is in said one position, and each lock-out relay having by-passing contacts connected between said common lock-out relay line and the other terminal of said lock-out relay when the associated alarm relay is in said first alarm-indicating position, whereby the actuation of the lock-out relay associated with the variable which first becomes abnormal into said one position disables all of the other lock-out relays.

14. An annunciator system for indicating the presence of abnormal variables in a group of interrelated variables comprising first means for each variable for providing a first alarm indication indicating that the associated variable was the first of the group to become abnormal, second means for each variable for providing a second alarm indication indicating that the associated variable became abnormal following the first-to-become abnormal variable, respective circuits for controlling the energization of said first and second alarm indicating means, an alarm relay for each variable having contacts in the energization circuits of the associated alarm indicating means and adapted to prepare said circuits for energization when said alarm relay is in a first abnormal-indicating position and to disable said circuits when the relay is in a second normal-indicating position, means for operating said alarm relays respectively into said first and second positions when the associated variables are respectively abnormal and normal, a lock-out relay for each variable having contacts in the energization circuits of the associated alarm indicating means, which contacts are adapted to energize the energization circuit of a prepared one of said associated alarm indicating means and to disable the energization circuit of the other associated alarm indicating means when said lock-out relay is in one position, and to energize the energization circuit of the said other prepared one of the associated alarm indicating means and to disable the energization circuit of said one alarm indicating means when said lock-out relay is in another position, means responsive to the operation of each alarm relay into said first position for actuating the associated lock-out relay into said one position and responsive to the operation of each alarm relay into said second position for actuating the associated lock-out relay into its other position, and means responsive to the operation of each lock-out relay into said one position for disabling the other lock-out relays.

References Cited in the file of this patent

UNITED STATES PATENTS

| 2,558,637 | Walz | June 26, 1951 |
| 2,600,132 | Seaton | June 10, 1952 |